US010300564B2

(12) United States Patent
Ichimiya et al.

(10) Patent No.: US 10,300,564 B2
(45) Date of Patent: May 28, 2019

(54) WELD JOINT

(71) Applicant: JFE STEEL CORPORATION, Tokyo (JP)

(72) Inventors: Katsuyuki Ichimiya, Tokyo (JP); Masao Yuga, Tokyo (JP); Kazukuni Hase, Tokyo (JP); Shigeru Endo, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 291 days.

(21) Appl. No.: 15/129,932

(22) PCT Filed: Mar. 31, 2015

(86) PCT No.: PCT/JP2015/001870
§ 371 (c)(1),
(2) Date: Sep. 28, 2016

(87) PCT Pub. No.: WO2015/151521
PCT Pub. Date: Oct. 8, 2015

(65) Prior Publication Data
US 2017/0173743 A1 Jun. 22, 2017

(30) Foreign Application Priority Data
Mar. 31, 2014 (JP) ................................. 2014-073750

(51) Int. Cl.
| | |
|---|---|
| *B23K 35/30* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/14* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C21D 9/18* | (2006.01) |
| *C21D 9/30* | (2006.01) |
| *C21D 9/50* | (2006.01) |
| *F16B 5/08* | (2006.01) |
| *B23K 9/23* | (2006.01) |
| *B23K 9/18* | (2006.01) |
| *B23K 103/04* | (2006.01) |

(52) U.S. Cl.
CPC ............ *B23K 35/3073* (2013.01); *B23K 9/18* (2013.01); *B23K 9/23* (2013.01); *B23K 35/30* (2013.01); *C22C 38/00* (2013.01); *C22C 38/001* (2013.01); *C22C 38/002* (2013.01); *C22C 38/02* (2013.01); *C22C 38/06* (2013.01); *C22C 38/14* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *F16B 5/08* (2013.01); *B23K 2103/04* (2018.08)

(58) Field of Classification Search
None
See application file for complete search history.

(56) References Cited

U.S. PATENT DOCUMENTS

| | | | | | |
|---|---|---|---|---|---|
| 5,300,751 | A | * | 4/1994 | Endo ..................... | B23K 9/23 219/137 WM |
| 8,124,247 | B2 | * | 2/2012 | Hayakawa ............. | C22C 38/02 219/73 |
| 9,777,358 | B2 | * | 10/2017 | Ichimiya ................ | C22C 38/02 |
| 9,790,579 | B2 | * | 10/2017 | Yuga ...................... | C22C 38/14 |
| 10,023,946 | B2 | * | 7/2018 | Terazawa ............... | C22C 38/02 |
| 10,036,079 | B2 | * | 7/2018 | Terazawa ............... | C22C 38/02 |
| 2010/0330388 | A1 | * | 12/2010 | Hara ....................... | B23K 9/18 428/586 |
| 2012/0018028 | A1 | | 1/2012 | Shimamura et al. | |

(Continued)

FOREIGN PATENT DOCUMENTS

| | | |
|---|---|---|
| CN | 1840728 A | 10/2006 |
| CN | 102308013 A | 1/2012 |

(Continued)

OTHER PUBLICATIONS

English translation of JP 2008/023569, Feb. 2008; 22 pages.*
English translation of JP 2003/138339, May 2003; 14 pages.*
English translation of JP 2003/147484, May 2003; 11 pages.*
Korean Office Action for Korean Application No. 2016-7026322, dated Jan. 26, 2018, with Concise Statement of Relevance of Office Action, 7 pages.
Chinese Office Action for Chinese Application No. 201580015633.2, dated Nov. 27, 2017 with Concise Statement of Relevance, 8 pages.
Korean Office Action for Korean Application No. 10-2016-7026322, dated Jun. 5, 2018, with Concise Statement of Relevance of Office Action, 6 pages.

(Continued)

*Primary Examiner* — Helene Klemanski
(74) *Attorney, Agent, or Firm* — Ratnerprestia

(57) ABSTRACT

A weld joint with an excellent CTOD property is produced with a weld metal, using a steel plate as a base metal. The steel plate has a chemical composition including C: 0.03% to 0.09%, Si: 0.01% to 0.35%, Mn: 1.3% to 2.0%, P: 0.012% or less, S: 0.0035% or less, Al: 0.01% to 0.06%, Ni: less than 0.3%, Mo: less than 0.10%, Nb: 0.005% to 0.023%, Ti: 0.005% to 0.025%, B: less than 0.0003%, N: 0.002% to 0.005%, Ca: 0.0005% to 0.0050%, and O: 0.0030% or less, with the components additionally satisfying a predetermined relationship. The weld metal has a chemical composition including C: 0.040% to 0.090%, Si: 0.1% to 0.8%, Mn: 1.0% to 2.5%, Al: 0.020% or less, Ni: 0.1% to 1.0%, Mo: 0.05% to 0.50%, Ti: 0.005% to 0.050%, and B: 0.0015% or less, the balance being Fe and incidental impurities.

8 Claims, No Drawings

(56) References Cited

U.S. PATENT DOCUMENTS

| | | | |
|---|---|---|---|
| 2013/0037162 A1* | 2/2013 | Shinohara | B23K 35/3073 138/171 |
| 2015/0075682 A1* | 3/2015 | Yuga | C22C 38/14 148/645 |
| 2015/0203945 A1 | 7/2015 | Ichimiya et al. | |
| 2016/0312327 A1* | 10/2016 | Ichimiya | C21D 9/50 |
| 2017/0137905 A1* | 5/2017 | Ichimiya | C22C 38/02 |
| 2017/0350434 A1* | 12/2017 | Maruyama | C21D 9/50 |

FOREIGN PATENT DOCUMENTS

| | | |
|---|---|---|
| EP | 2272994 A1 * | 1/2011 |
| JP | 60184663 | 9/1985 |
| JP | 0353367 | 8/1991 |
| JP | 3045856 | 5/2000 |
| JP | 2003/138339 A * | 5/2003 |
| JP | 2003/147484 A * | 5/2003 |
| JP | 3697202 | 9/2005 |
| JP | 3722044 | 11/2005 |
| JP | 2007231312 | 9/2007 |
| JP | 2007/260715 A * | 10/2007 |
| JP | 2007/260716 A * | 10/2007 |
| JP | 2007260715 A | 10/2007 |
| JP | 2007260716 A | 10/2007 |
| JP | 2008023569 | 2/2008 |
| JP | 2011020163 A | 2/2011 |
| KR | 20110100317 A | 9/2011 |
| WO | 2009123292 | 10/2009 |
| WO | 2013118313 | 8/2013 |
| WO | 2014038200 A1 | 3/2014 |

OTHER PUBLICATIONS

Chinese Office Action for Chinese Application No. 201580015633.2, dated May 18, 2017 with English Search Report, 7 pages.

Externded European Search Report for European Application No. 15772620.9, dated May 2, 2017, 10 pages.

International Search Report and Written Opinion for International Application No. PCT/JP2015/001870, dated Jun. 30, 2015, 6 pages.

* cited by examiner

WELD JOINT

CROSS REFERENCE TO RELATED APPLICATIONS

This is the U.S. National Phase application of PCT/JP2015/001870, filed Mar. 31, 2015, which claims priority to Japanese Patent Application No. 2014-073750, filed Mar. 31, 2014, the disclosures of each of these applications being incorporated herein by reference in their entireties for all purposes.

TECHNICAL FIELD

This disclosure relates to a weld joint that uses a high-tensile-strength steel plate as the base metal and is provided for use in steel structures such as marine structures, wind turbine generators, ships, pressure vessels, and penstocks. In particular, this disclosure relates to a weld joint that is produced with weld metal that has excellent toughness and that uses, as the base metal, high-tensile-strength steel plates with yield stress (YS) of 355 MPa or greater and excellent low temperature toughness in the weld zone when forming a multilayer weld.

BACKGROUND

Steel used in ships, marine structures, wind power generation facilities, pressure vessels, and the like is welded to form structures with desired shapes.

Therefore, from the perspective of structural safety, these steels are not only required to have base metal with high strength and excellent toughness but also to have excellent toughness in weld joints (weld metal and Heat-Affected Zone (HAZ)).

The absorbed energy by a Charpy impact test has mainly been used as the basis for evaluating the toughness of steel. In recent years, however, a Crack Tip Opening Displacement test (CTOD test; the evaluation results of this test are referred to below as CTOD property or CTOD value) has often been used for greater reliability. This test evaluates the resistance to occurrence of brittle fracture by generating a fatigue precrack in a test piece at the location of toughness evaluation, subjecting the test piece to three-point bending, and measuring the amount of the crack opening (plastic deformation volume) immediately before fracture.

Since a fatigue precrack is used in a CTOD test, an extremely small region is evaluated for toughness. If a local brittle zone exists, a low toughness may in some cases be indicated, even if a good toughness is obtained with a Charpy impact test.

The local brittle zones easily occur in the Heat-Affected Zone (HAZ), which is subjected to a complicated thermal history due to a multilayer fill weld in a thick steel plate or the like. The bond (the boundary between weld metal and base metal) and a region in which the bond is formed into a dual phase region by reheating (a region in which coarse grains are formed in the first cycle of welding and which is heated into a ferrite and austenite dual phase region by the subsequent welding pass, hereinafter referred to as a dual phase reheating area) become local brittle zones.

Since the bond is exposed to a high temperature just below the melting point, austenite grains are coarsened and are likely to be transformed, by the subsequent cooling, into an upper bainite microstructure that has a low toughness. Therefore, the toughness of the matrix itself is low. Furthermore, brittle microstructures such as a Widmanstatten microstructure or isolated martensite (MA) easily occur in the bond, resulting in an even lower toughness.

In order to improve the toughness of the Heat-Affected Zone (HAZ), for example a technique that incorporates Ti/N in the steel by fine particle distribution to reduce coarsening of austenite grains and to create ferrite nucleation sites has been put to practical use. The bond, however, may be heated to a temperature region at which TiN dissolves. As the demand for low temperature toughness of the weld zone becomes more stringent, it becomes more difficult to obtain the above-described effect.

JP H03-053367 B2 (PTL 1) and JP S60-184663 A (PTL 2) disclose techniques in which, by dispersing fine grains in steel by means of combined addition of rare-earth elements (REM) and Ti, grain growth of austenite is suppressed, thereby improving the toughness of the weld zone.

A technique for dispersing Ti oxides, a technique for combining the capability of ferrite product nuclei of BN with oxide dispersion, and a technique for adding Ca and a REM to control the morphology of sulfides so as to increase the toughness have also been proposed.

These techniques target relatively low strength steel material with a small amount of alloying elements. Unfortunately, these techniques cannot be applied to higher strength steel material with a large amount of alloying elements, since the HAZ, microstructure does not include ferrite.

Therefore, as a technique for facilitating generation of ferrite in the heat-affected zone, JP 3697202 B2 (PTL 3) discloses a technique that mainly increases the added amount of Mn to 2% or more. With continuous casting material, however, Mn tends to segregate in the central portion of the slab. The central segregation area becomes harder not only in the base metal but also in the heat-affected zone and becomes the origin of fracture, thereby triggering a reduction in the base metal and HAZ toughness.

On the other hand, in the dual phase reheating area, carbon becomes concentrated in a region where reverse transformation to austenite occurs due to dual phase reheating, and brittle bainite microstructures including isolated martensite are generated during cooling, resulting in reduced toughness. Therefore, techniques have been disclosed to reduce the contents of C and Si in the steel chemical composition, inhibit the generation of isolated martensite, and improve the toughness, and to ensure the base metal strength by adding Cu (for example, JP 3045856 B2 (PTL 4)). These techniques increase the strength by precipitating Cu, but in the method of PTL 4, the cooling rate after rolling is 0.1° C./s or less, and Cu particles are precipitated during this process. This approach is problematic in terms of manufacturing stability.

JP 3722044 B2 (PTL 5) proposes a weld joint with excellent toughness resulting from the combination of the steel plate chemical composition and the weld metal chemical composition. With this technique, excellent toughness is obtained through control of the chemical composition of the HAZ and the weld metal by guaranteeing at least a certain amount of B in the steel plate and the weld metal, Depending on the welding conditions, however, the addition of B encourages generation of a hard phase, such as martensite, which may instead cause the toughness to worsen.

CITATION LIST

Patent Literature

PTL 1: JP H03-053367 B2
PTL 2: JP S60-184663 A

PTL 3: JP 3697202 B2
PTL 4: JP 3045856 B2
PTL 5: JP 3722044 B2

SUMMARY

Technical Problem

In recent years, steel structures such as ships, marine structures, wind power generation facilities, pressure vessels, and penstocks have increased in size, leading to a desire for even higher strength steel material. The steel material used in these steel structures is often thick material, for example with a plate thickness of 30 mm or more. Therefore, in order to ensure a strength such that the yield stress is at least 355 MPa grade, a steel chemical composition with a large added amount of alloying elements is advantageous. As described above, however, sufficient examination has not been made of how to improve toughness of the bonds and the dual phase reheating areas in high-tensile-strength steel material with a large amount of alloying elements.

It would therefore be helpful to provide a weld joint with an excellent CTOD property that uses, as the base metal, a high-tensile-strength steel plate that has yield stress (YS) of 355 MPa or greater and excellent low temperature toughness in the heat-affected zone of a multilayer weld (CTOD property) and is suitable for steel structures such as marine structures, ships, wind power generation facilities, pressure vessels, and penstocks.

Solution to Problem

In order to solve the above problems, we made intensive studies and specifically designed the chemical composition of steel based on the following technical concepts, thereby completing this disclosure.

i) Since the CTOD property is evaluated with a test piece having the entire thickness of the steel plate, the central segregation area where components are concentrated becomes the origin of fracture. Consequently, in order to improve the CTOD property of the heat-affected zone, elements that easily concentrate as central segregation of the steel plate are controlled to a proper amount, thereby suppressing the hardening of the central segregation area. At the center of the slab, which is the last portion to solidify when the molten steel solidifies, the concentration of C, Mn, P, Ni, and Nb is higher than the concentration of other elements. Hence, the added amounts of these elements are controlled on the basis of the central segregation area hardness index, thereby reducing the hardness of the central segregation area.

ii) In order to improve the toughness of the heat-affected zone, Ti/N is used efficiently to suppress coarsening of the austenite grains in the vicinity of the weld bond. Controlling the Ti/N ratio to an appropriate level allows uniform fine particle distribution of Ti/N in the steel.

iii) Crystallization of the Ca compound (CaS), which is added for morphological control of sulfides, is used to improve the toughness of the heat-affected zone. Since CaS crystallizes at a low temperature as compared to oxides, CaS can be distributed uniformly as fine particles. Furthermore, by controlling the amount of CaS added and the amount of dissolved oxygen in the molten steel at the time of addition to be within appropriate ranges, solute S can also be guaranteed after CaS crystallization. Hence, MnS precipitates on the surface of the CaS to form a complex sulfide. Since a Mn dilute zone is formed around the MnS, ferrite transformation is further promoted.

iv) In order to guarantee low temperature toughness, the generation of grain boundary ferrite and Widmannstatten ferrite is preferably suppressed, and fine acicular ferrite is preferably present. Therefore, it is effective to add B, which suppresses generation of ferrite by segregating at grain boundaries, to the weld metal. Depending on the welding conditions, however, coarse iron-carbon borides may be generated, thereby instead reducing the toughness. Hence, an appropriate amount of B needs to be added. Another reason that an appropriate amount of B is necessary is that B may disperse from the weld metal to the base metal side (HAZ) and encourage generation of martensite, which is a brittle phase that increases the quench hardenability of the HAZ, causing toughness to degrade.

This disclosure was completed based on the above discoveries, and the primary features thereof are as follows.

1. A weld joint produced with a weld metal, using a steel plate as a base metal, wherein the steel plate comprises a chemical composition including (consisting of), by mass %,
   C: 0.03% to 0.09%,
   Si: 0.01% to 0.35%,
   Mn: 1.3% to 2.0%,
   P: 0.012% or less,
   S: 0.0035% or less,
   Al: 0.01% to 0.06%,
   Ni: less than 0.3%,
   Mo: less than 0.10%,
   Nb: 0.005% to 0.023%,
   Ti: 0.005% to 0.025%,
   B: less than 0.0003%,
   N: 0.002% to 0.005%,
   Ca: 0.0005% to 0.0050%, and
   O: 0.0030% or less,
   Ceq specified by formula (1) below being from 0.320 to 0.420, Ti/N being from 1.5 to 4.0, formulas (2) and (3) below being satisfied, and a balance being Fe and incidental impurities; and
   the weld metal comprises a chemical composition including (consisting of), by mass %,
   C: 0.040% to 0.090%,
   Si: 0.1% to 0.8%,
   Mn: 1.0% to 2.5%,
   Al: 0.02% or less,
   Ni: 0.1% to 1.0%,
   Mo: 0.05% to 0.50%,
   Ti: 0.005% to 0.050%, and
   B: 0.0015% or less,
   a balance being Fe and incidental impurities:

$$Ceq=[C]+[Mn]/6+([Cu]+[Ni])/15+([Cr]+[Mo]+[V])/5 \quad (1)$$

$$0<\{[Ca]-(0.18+130\times[Ca])\times[O]\}/1.25/[S]<1 \quad (2)$$

$$5.5[C]^{4/3}+15[P]+0.90[Mn]+0.12[Ni]+7.9[Nb]^{1/2}+0.53[Mo]\leq 3.00 \quad (3)$$

where brackets [ ] indicate the content by mass % of the element in the brackets.

2. The weld joint of 1, wherein the steel plate further includes, by mass %, at least one selected from the group consisting of:
   Cu: 0.7% or less,
   Cr: 0.1% to 1.0%, and
   V: 0.005% to 0.050%.

3. The weld joint of 1 or 2, wherein a hardness of a central segregation area of the steel plate satisfies formula (4) below:

$$Hvmax/Hvave \leq 1.35 + 0.006/[C] - t/500 \quad (4)$$

where Hvmax is a maximum Vickers hardness of the central segregation area,

Hvave is an average Vickers hardness of a portion excluding the central segregation area and sections from both front and back surfaces inward to ¼ of a plate thickness,

[C] is the C content by mass %, and t is a plate thickness of the steel plate in millimeters.

4. The weld joint of 1, 2, or 3, wherein the weld metal further includes, by mass %, at least one selected from the group consisting of:

Cu: 0.01% to 0.20%,
Cr: 0.01% to 0.50%,
V: 0.001% to 0.080%, and
Nb: 0.001% to 0.040%.

Advantageous Effect

We thus provide a weld joint with a yield strength (YS) of 355 MPa or greater, which is suitable for use in large steel structures such as marine structures, and with an excellent CTOD property in the multilayer weld. This weld joint is extremely useful in industrial terms.

DETAILED DESCRIPTION

The reasons why the chemical compositions of the steel plate and weld metal have been restricted to the aforementioned ranges will be described for each element. The unit "%" in the chemical composition described below is "mass %" unless otherwise specified.

First, the reason for limiting the chemical composition of the steel. plate that becomes the base metal is explained.

C: 0.03% to 0.09%

C is a necessary element for ensuring the strength of the steel plate that becomes the base metal. When the C content is less than 0.03%, quench hardenability is degraded, and it becomes necessary to add a large amount of quench hardenability-improving elements, such as Cu, Ni, Cr, or Mo, in order to ensure strength, resulting in a rise in costs. When the amount of C added exceeds 0.09%, the toughness of the weld zone degrades. Therefore, the C content is set in the range of 0.03% to 0.09%, and is preferably 0.040% to 0.085%.

Si: 0.01% to 0.35%

Si is added as a deoxidizing material and in order to obtain base metal strength. Adding a large amount exceeding 0.35%, however, leads to deterioration in weldability and toughness of the weld joint. Therefore, the Si content needs to be set in the range of 0.01% to 0.35%, preferably 0.28% or less, and more preferably 0.03% to 0.25%.

Mn: 1.3% to 2.0%

In order to ensure the base metal strength and the weld joint strength, Mn is added to a content of 1.3% or more. Upon the Mn content exceeding 2.0%, however, weldability deteriorates, quench hardenability becomes excessive, and the toughness of the base metal and the toughness of the weld joint deteriorate. Therefore, the Mn content is set in a range of 1.3% to 2.0%, preferably 1.4% to 1.9%, and more preferably 1.4% to 1.8%.

P: 0.012% or less

P is an impurity element and degrades the toughness of the base metal and the toughness of the weld zone. In particular, when the P content in the weld zone exceeds 0.012%, the CTOD property markedly degrades. Therefore, the P content is set to 0.012% or less, and preferably 0.009% or less.

S: 0.0035% or less

S is an impurity element that is mixed in inevitably. When the content thereof exceeds 0.0035%, the toughness of the base metal and the weld zone deteriorates. Therefore, the content is set to 0.0035% or less, and preferably 0.0030% or less.

Al: 0.01% to 0.06%

Al is an element to be added in order to deoxidize molten steel, and the Al content needs to be set to 0.01% or more. When the Al content exceeds 0.06%, however, the toughness of the base metal and the weld zone is degraded, and Al is mixed into the weld metal by dilution due to welding, thereby degrading toughness. Therefore, the Al content is limited to 0.06% or less and is preferably 0.017% to 0.055%. In this disclosure, the Al content is specified in terms of acid-soluble Al (also referred to as "Sol.Al" or the like).

Ni: less than 0.3%

Ni is an element useful for improving the strength and toughness of steel and is also useful for improving the CTOD property of the weld zone. Hence, the Ni content is preferably 0.05% or more. Ni is an expensive element, however, and excessive addition thereof also increases the likelihood of damage to the surface of the slab at the time of casting. Therefore, when Ni is added, the upper limit is set to less than 0.3% and is more preferably 0.06% to 0.28%.

Mo: less than 0.10% (including the case of 0%)

Mo is a useful element for increasing strength and may be included as necessary. On the other hand, Mo causes brittle martensite to be generated in the heat-affected zone. Hence, the content of Mo when added is set to less than 0.10%, preferably less than 0.08%.

Nb: 0.005% to 0.023%

Nb contributes to the formation of an unrecrystallized zone of austenite in the low temperature region. By performing rolling in such a temperature region, the microstructure of the base metal can be refined and the toughness of the base metal can be increased. Furthermore, Nb has the effect of improving the quench hardenability and of improving the resistance to softening at the time of tempering and is a useful element for improving the strength of the base metal. In order to obtain these effects, the Nb content needs to be at least 0.005%. Nb content exceeding 0.023%, however, promotes the generation of upper bainite and martensite, which degrade the toughness in the heat-affected zone. Hence, the upper limit on the Nb content is set to 0.023%, preferably 0.020%, and more preferably 0.008% to 0.020%.

Ti: 0.005% to 0.025%

Ti is precipitated as TiN when molten steel solidifies, which suppresses coarsening of austenite in the weld zone, thus contributing to improvement in the toughness of the weld zone. When the Ti content is less than 0.005%, however, such an effect is small. On the other hand, when the Ti content exceeds 0.025%, Ti/N coarsens, and it is not possible to obtain the effect of improving the toughness of the base metal and the weld zone. Therefore, the Ti content is set to be from 0.005% to 0.025%, preferably 0.006% to 0.020%, and more preferably 0.008% to 0.016%.

B: less than 0.0003%

When steel is cooled from the austenite region, B exists in a segregated manner at austenite grain boundaries, suppresses ferrite transformation, and generates bainite microstructures that include a large amount of martensite. The addition of B makes the microstructure brittle particularly in the heat-affected zone and is therefore limited to less than 0.0003%.

N: 0.002% to 0.005%

N reacts with Ti and Al to form precipitates. Crystal grains are thereby refined, and the toughness of the base metal is improved. Furthermore, N is a necessary element for forming Ti/N, which suppresses coarsening of the microstructure of the weld zone. In order to obtain such effects, the N content needs to be set to 0.002% or more. On the other hand, when the N content exceeds 0.005%, solute N markedly degrades the toughness of the base metal and the weld zone and leads to a deterioration in strength due to a reduction in solute Nb caused by generation of complex precipitates of Ti/Nb. Therefore, the upper limit on the N content is set to 0.005% and is more preferably 0.0025% to 0.0045%.

Ca: 0.0005% to 0.0050%

Ca is an element that improves toughness by fixing S. In order to obtain this effect, the Ca content needs to be at least 0.0005%. Ca content exceeding 0.0050%, however, causes saturation of the effect. Therefore, Ca is added in the range of 0.0005% to 0.0050% and more preferably 0.008% to 0.0035%.

O: 0.0030% or less

If the O content exceeds 0.0030%, the toughness of the base metal deteriorates. Hence, the O content is set to 0.0030% or less, preferably 0.0025% or less.

It is also crucial that Ceq as specified by formula (1) below be 0.320 to 0.420, that Ti/N be 1.5 to 4.0, and that formulas (2) and (3) below be satisfied, where the brackets [ ] in each formula indicate the content (mass %) of the element in the brackets.

$$Ceq=[C]+[Mn]/6+([Cu]+[Ni])/15+([Cr]+[Mo]+[V])/5 \quad (1)$$

$$0<\{[Ca]-(0.18+130\times[Ca])\times[O]\}/1.25/[S]<1 \quad (2)$$

$$5.5[C]^{4/3}+15[P]+0.90[Mn]+0.12[Ni]+7.9[Nb]^{1/2}+0.53[Mo]\leq3.00 \quad (3)$$

Ceq: 0.320 to 0.420

When Ceq specified by formula (1) is less than 0.320, a strength that has 355 MPa grade yield stress is difficult to obtain. On the other hand, if Ceq exceeds 0.420, the weldability and the toughness of the weld zone deteriorate. Hence, Ceq is set to 0.420 or less and is preferably 0.340 to 0.420.

Ti/N: 1.5 to 4.0

When the value of Ti/N is less than 1.5, the amount of Ti/N formed decreases, and solute N not forming Ti/N degrades the toughness of the weld zone. When the value of Ti/N exceeds 4.0, Ti/N is coarsened and degrades the toughness of the weld zone. Accordingly, the range of Ti/N is 1.5 to 4.0, preferably 1.8 to 3.5. Ti/N is the ratio of the content (mass %) of each element.

$$0<\{[Ca]-(0.18+130\times[Ca])\times[O]\}/1.25/[S]<1$$

The expression $\{[Ca]-(0.18+130\times[Ca])\times[O]\}/1.25/[S]$ is a value representing the Atomic Concentration Ratio (ACR) of Ca and S, which are effective for sulfide morphological control. The sulfide morphology can be estimated by this value, and this value needs to be specified in order to finely disperse CaS which does not dissolve even at high temperatures and which acts as nuclei for ferrite transformation. In other words, when ACR is 0 or less, CaS is not crystallized. Consequently, S is precipitated in the form of MnS only, thereby making it impossible to obtain ferrite product nuclei in the heat-affected zone. Furthermore, the MnS precipitated alone is elongated during rolling and causes degradation in the toughness of the base metal.

On the other hand, when ACR is 1 or greater, S is completely fixed by Ca, and MnS that functions as a ferrite product nucleus is no longer precipitated on CaS. Therefore, complex sulfides can no longer achieve the fine dispersion of ferrite product nuclei, making it impossible to obtain the effect of improving toughness. In this way, when ACR is greater than 0 and less than 1, MnS precipitates on CaS to form complex sulfides, which function effectively as ferrite product nuclei. The ACR value is preferably in the range of 0.2 to 0.8.

$$5.5[C]^{4/3}+15[P]+0.90[Mn]+0.12[Ni]+7.9[Nb]^{1/2}+0.53[Mo]\leq3.00$$

The value of $5.5[C]^{4/3}+15[P]+0.90[Mn]+0.12[Ni]+7.9[Nb]^{1/2}+0.53[Mo]$ is the hardness index of the central segregation area formed by components that are likely to be concentrated in the central segregation area and is referred to below as the Ceq* value. A CTOD test is carried out over the entire thickness of a steel plate. Accordingly, test pieces used in the test include central segregation. If the composition concentration in the central segregation is significant, a hardened region occurs in the heat-affected zone, preventing a good CTOD value from being obtained. By controlling the Ceq* value to be in an appropriate range, an excessive increase in hardness in the central segregation area can be suppressed, and an excellent CTOD property can be obtained even in the weld zone of thick steel material. The appropriate range of the Ceq* value has been experimentally obtained. When the Ceq* value exceeds 3.00, the CTOD property is degraded. Therefore, the Ceq* value is set to be 3.00 or less, preferably 2.90 or less.

The basic chemical composition of this disclosure has been described, but in order to further improve the steel properties, at least one selected from the group consisting of Cu: 0.7% or less, Cr: 0.1% to 1.0%, and V: 0.005% to 0.050% may be added.

Cu: 0.7% or less

Cu is effective for increasing the strength of the base metal. To this end, Cu is preferably added in an amount of 0.1% or more. If the amount added exceeds 0.7%, however, the hot ductility deteriorates. Hence, the amount is preferably 0.7% or less, more preferably 0.6% or less.

Cr: 0.1% to 1.0%

Cr is an element effective in increasing the strength of the base metal. In order to obtain this effect, the Cr content is preferably set to 0.1% or more. However, since excess Cr adversely affects toughness, the Cr content is preferably set to 1.0% or less when added, and more preferably 0.2% to 0.8%.

V: 0.005% to 0.050%

V is an element that is effective in improving the strength and toughness of the base metal at a content of 0.005% or more. Setting the V content to exceed 0.050%, however, leads to deterioration of toughness. Therefore, the V content is preferably 0.005% to 0.050% when added.

Furthermore, specifying the toughness of the central segregation area in the steel plate as indicated below is useful for improving the CTOD property.

$$Hv\mathrm{max}/Hv\mathrm{ave}\leq1.35+0.006/[C]-t/500$$

First, in the expression above, Hvmax is the maximum Vickers hardness of the central segregation area, Hvave is the average Vickers hardness of a portion excluding the central segregation area and sections from both front and back surfaces inward to ¼ of the plate thickness, [C] is the C content (mass %), and t is the plate thickness (mm).

In other words, Hvmax/Hvave is a dimensionless parameter expressing the hardness of the central segregation area. If this value becomes higher than the value calculated by $1.35+0.006/[C]-t/500$, the CTOD value degrades. Therefore, Hvmax/Hvave is preferably set to be equal to or less than $1.35+0.006/[C]-t/500$, more preferably equal to or less than $1.25+0.006/[C]-t/500$.

Hvmax is calculated by measuring, in the thickness direction of the steel plate, a (plate thickness/40) mm range that includes the central segregation area in a Vickers hardness tester (load of 10 kgf) at 0.25 mm intervals in the plate thickness direction and taking the maximum value among the resulting measured values. Hvave is calculated as the average of values obtained by measuring a range between a position at ¼ plate thickness from the steel plate front surface and a position at ¼ plate thickness from the back surface, excluding the central segregation area, in a Vickers hardness tester with a load of 10 kgf at constant intervals in the plate thickness direction (for example, 1 mm to 2 mm).

Next, the reason for limiting each element in the chemical composition of the weld metal is explained.

C: 0.040% to 0.090%

In order to ensure the strength of the weld metal, it is necessary to add C to a content of 0.04% or more. On the other hand, C content exceeding 0.09% leads to deterioration in toughness due to excessive quench hardenability. Accordingly, the C content is set to be from 0.04% to 0.09% and is preferably 0.050% to 0.085%.

Si: 0.1% to 0.8%

Si is added to ensure deoxidation and strength, but if the content is less than 0.1%, the fluidity of the weld metal is reduced, increasing the likelihood of weld defects. If the Si content exceeds 0.8%, the strength of the weld metal becomes excessive, causing cracks and reducing the toughness. Accordingly, the Si content is set to be from 0.1% to 0.8%, is preferably 0.1% to 0.6%, and is more preferably 0.1% to 0.5%.

Mn: 1.0% to 2.5%

In order to ensure the strength of the weld metal, it is necessary to add Mn to a content of 1.0% or more. However, Mn content exceeding 2.5% causes excessive quench hardenability, and the toughness reduces. Accordingly, the Mn content is set to be from 1.0% to 2.5% and is preferably 1.0% to 2.0%.

Al: 0.020% or less

Al needs to be added for deoxidation, preferably to 0.004% or more. If the content exceeds 0.020%, however, many inclusions occur, and the generation of Ti oxides is suppressed, leading to coarsening of the weld metal microstructure and reducing toughness. Hence, the Al content is set to 0.020% or less.

Ni: 0.1% to 1.0%

Addition of Ni is necessary to guarantee the strength and toughness of the weld metal, but these effects are not achieved at a content of less than 0.1%. Conversely, Ni content exceeding 1.0% reduces fluidity. Accordingly, the Ni content is set to be from 0.1% to 1.0% and is preferably 0.1% to 0.8%.

Mo: 0.05% to 0.50%

Addition of Mo is necessary to guarantee the strength and toughness of the weld metal, but these effects are not achieved at a content of less than 0.05%. Mo content exceeding 0.50%, however, causes saturation of these effects. Therefore, the upper limit on Mo is set at 0.50%, and the content is preferably 0.08% to 0.45%.

Ti: 0.005% to 0.050%

Ti fixes the N in the weld metal as Ti/N, forms oxides, and fulfills an important function as a product nucleus for acicular ferrite. If the N content is less than 0.005%, these effects are not sufficiently achieved, whereas if the content exceeds 0.050%, solute Ti increases, causing a significant degradation in toughness. Accordingly, the Ti content is set to be from 0.005% to 0.050% and is preferably 0.006% to 0.045%.

B: 0.0015% or less

B is effective for increasing the strength of the weld metal and is therefore preferably added to a content of 0.0003% or more. Excessive addition of B, however, generates coarse iron-carbon borides. Hence the content of B is set to 0.0015% or less.

Furthermore, Cu, Cr, V, and Nb may be added independently or in combination as optional elements for adjusting quench hardenability by welding heat input.

Cu: 0.01% to 0.20%

Cu is effective for increasing the strength of the weld metal. In order to achieve this effect, Cu is preferably added to a content of 0.01% or more, but upon exceeding 0.20%, high-temperature cracks and a reduction in toughness occur. Hence, the content of Cu is preferably set to 0.20% or less.

Cr: 0.01% to 0.50%

Cr is effective for increasing the strength of the weld metal. In order to achieve this effect, Cr is preferably added to a content of 0.01% or more. Cr content exceeding 0.50%, however, reduces toughness. Hence, the Cr content is preferably set to 0.50% or less, V: 0.001% to 0.080%

V is effective for increasing the strength of the weld metal. In order to achieve this effect, V is preferably added to a content of 0.001% or more. V content exceeding 0.080%, however, reduces toughness. Hence, the V content is preferably set to 0.080% or less.

Nb: 0.001% to 0.040%

Nb is effective for increasing the strength of the weld metal. In order to achieve this effect, Nb is preferably added to a content of 0.001% or more. Nb content exceeding 0.040%, however, reduces toughness. Hence, the Nb content is preferably set to 0.040% or less.

The weld joint of this disclosure is preferably produced in accordance with the method of production described below.

Specifically, molten steel adjusted to have the aforementioned chemical composition is prepared by steelmaking with an ordinary method using a converter, an electric heating furnace, a vacuum melting furnace, or the like. Next, after forming the molten steel into a slab by continuous casting, the slab is hot rolled to a desired plate thickness. The result is then cooled, and tempering is additionally performed, yielding a steel plate with a thickness of 30 mm or greater.

During the hot rolling, the slab reheating temperature and rolling reduction are preferably specified. Specifically, in order to provide the base metal with high strength and good toughness, the slab reheating temperature is preferably set to be from 1000° C. to 1200° C., and the overall rolling reduction is preferably set to be 50% or greater.

Taking steel plates obtained in this way as base metal, weld metal adjusted to the aforementioned chemical composition is used to produce a weld joint. At this time, when the thickness of the steel plates is 40 mm or less, an X-shaped groove is formed in the steel plates, and both-side single-layer submerged arc welding is performed. When the thickness of the steel plates exceeds 40 mm, an X-shaped or V-shaped groove is formed in the steel plates, and multilayer fill submerged arc welding is performed.

In other words, both-side single-layer submerged arc welding is only used in the case of thin material with a plate thickness of 40 mm or less. Multilayer fill submerged arc welding can be performed with a heat input of 80 kJ/cm or more. If both-side single-layer welding is performed when the plate thickness exceeds 40 mm, the heat input greatly exceeds 100 kJ/cm, which may prevent the properties of the weld zone from being maintained. By contrast, multilayer fill welding can be performed with an approximate upper limit of 100 kJ/cm.

EXAMPLES

Steels having the respective chemical compositions shown in Table 1 were each obtained by steelmaking, and steel plates with a thickness of 30 mm to 100 mm were produced. The base metal was evaluated by a tensile test in which JIS No. 4 test pieces were collected from the 1/2 position along the thickness of the steel plates, so that the longitudinal direction of each test piece was perpendicular to the rolling direction of the steel plate. The yield stress (YS) and tensile strength (TS) were then measured in accordance with JIS Z 2241.

A Charpy impact test was also performed by collecting JIS V-notch test pieces from the 1/2 position along the thickness of the steel plates, so that the longitudinal direction of each test piece was perpendicular to the rolling direction of the steel plate. The absorbed energy vE-40° C. at −40° C. was then measured.

The base metal properties were evaluated as being good when all of the following relationships were satisfied: YS≥355 MPa, TS≥470 MPa, and vE-40° C.≥200 J.

As the weld joint, a multilayer fill weld joint was produced by submerged arc welding. The welding was performed with a heat input of 100 kJ/cm.

The toughness was evaluated by measuring the absorbed energy vE-40° C. at −40° C. with a Charpy impact test, using the weld metal center and the weld bond at the 1/4 position along the thickness of the steel plates as the notch position for the test.

Regarding weld properties, the toughness of the weld joint was determined to be good when the mean for three tests satisfied the relationship vE-40° C.≥150 J.

Using the weld metal center and the weld bond as the notch position for the CTOD test pieces, the CTOD value at −10° C., i.e. δ−10° C., was measured. The CTOD property of the weld joint was determined to be good when the minimum of the CTOD value (δ−10° C.) over three tests was 0.50 mm or greater.

Table 2 lists the chemical composition of the weld metal and the results of the Charpy impact test and CTOD test on the weld joint.

Regarding the chemical composition of the base metal, steel numbers 1 to 5 are Examples, whereas steel numbers 6 to 24 are Comparative Examples for which one or more of the contents in the chemical composition and the values of the formulas are outside of the ranges of this disclosure.

In Table 2, weld codes A, B, D, E, H, I, J, and M are all Examples for which the results of the Charpy impact test on the weld bond and the results of the three-point bending CTOD test on the weld bond satisfied the targets.

By contrast, for weld codes C, F, G, K, and N to S, the steel plate chemical composition and/or the weld metal chemical composition were outside of the ranges of this disclosure, and the base metal properties or the results of the Charpy impact test on the weld bond and the results of the three-point bending CTOD test on the weld bond did not satisfy the targets.

From the results in Tables 1 and 2, it is clear that in a steel plate according to this disclosure, the yield stress (YS) of the base metal is 355 MPa or greater, the Charpy absorption energy (vE-40° C.) is 200 J or greater, and both the strength and toughness of the base metal are excellent. Furthermore, regarding the weld metal of the weld joint and the bond, vE-40° C. is 150 J or greater, the CTOD value is 0.5 mm or greater, and the toughness of the heat-affected zone is excellent. By contrast, in all of the results for the Comparative Examples that fell outside of the ranges of this disclosure, at least one of the above properties degraded.

TABLE 1

| Steel No. | C | Si | Mn | P | S | Al | Ni | Mo | Nb | Ti | B | N | Ca |
|---|---|---|---|---|---|---|---|---|---|---|---|---|---|
| 1 | 0.041 | 0.10 | 1.74 | 0.006 | 0.0012 | 0.029 | 0.22 | 0.06 | 0.017 | 0.009 | 0.0002 | 0.0034 | 0.0018 |
| 2 | 0.064 | 0.16 | 1.53 | 0.006 | 0.0013 | 0.037 | 0.11 | 0.07 | 0.019 | 0.011 | 0.0001 | 0.0035 | 0.0021 |
| 3 | 0.063 | 0.22 | 1.41 | 0.002 | 0.0021 | 0.029 | 0.07 | — | 0.008 | 0.012 | 0.0002 | 0.0038 | 0.0025 |
| 4 | 0.045 | 0.18 | 1.78 | 0.004 | 0.0027 | 0.023 | 0.25 | 0.07 | 0.019 | 0.009 | 0.0001 | 0.0026 | 0.0027 |
| 5 | 0.074 | 0.15 | 1.61 | 0.006 | 0.0016 | 0.023 | 0.18 | 0.07 | 0.013 | 0.012 | 0.0002 | 0.0037 | 0.0020 |
| 6 | 0.121 | 0.23 | 1.62 | 0.005 | 0.0010 | 0.023 | — | 0.06 | 0.008 | 0.010 | 0.0001 | 0.0029 | 0.0023 |
| 7 | 0.087 | 0.47 | 1.45 | 0.004 | 0.0011 | 0.035 | — | 0.07 | 0.013 | 0.009 | 0.0001 | 0.0036 | 0.0011 |
| 8 | 0.080 | 0.17 | 1.18 | 0.003 | 0.0013 | 0.036 | — | — | 0.006 | 0.013 | 0.0001 | 0.0033 | 0.0018 |
| 9 | 0.047 | 0.06 | 2.41 | 0.005 | 0.0023 | 0.039 | 0.28 | — | 0.011 | 0.011 | 0.0002 | 0.0025 | 0.0010 |
| 12 | 0.077 | 0.24 | 1.63 | 0.002 | 0.0025 | 0.026 | 0.25 | 0.07 | 0.020 | 0.012 | 0.0012 | 0.0036 | 0.0012 |
| 13 | 0.032 | 0.23 | 1.57 | 0.005 | 0.0025 | 0.040 | 0.18 | 0.06 | 0.019 | 0.011 | 0.0001 | 0.0029 | 0.0027 |
| 14 | 0.059 | 0.08 | 1.47 | 0.004 | 0.0013 | 0.019 | — | 0.06 | 0.051 | 0.008 | 0.0001 | 0.0036 | 0.0029 |
| 15 | 0.058 | 0.13 | 1.63 | 0.002 | 0.0016 | 0.018 | — | 0.07 | 0.019 | 0.039 | 0.0002 | 0.0035 | 0.0020 |
| 16 | 0.063 | 0.13 | 1.65 | 0.006 | 0.0024 | 0.027 | — | 0.08 | 0.018 | 0.012 | 0.0001 | 0.0075 | 0.0024 |
| 17 | 0.058 | 0.20 | 1.53 | 0.004 | 0.0012 | 0.015 | 0.05 | 0.08 | 0.009 | 0.008 | 0.0001 | 0.0027 | 0.0026 |
| 18 | 0.037 | 0.16 | 1.52 | 0.006 | 0.0022 | 0.015 | 0.25 | 0.88 | 0.022 | 0.010 | 0.0001 | 0.0029 | 0.0018 |
| 19 | 0.051 | 0.21 | 1.66 | 0.002 | 0.0020 | 0.013 | 0.17 | 0.07 | 0.022 | 0.013 | 0.0001 | 0.0036 | 0.0015 |
| 20 | 0.086 | 0.20 | 1.49 | 0.005 | 0.0007 | 0.012 | — | 0.05 | 0.015 | 0.010 | 0.0002 | 0.0031 | 0.0006 |
| 21 | 0.084 | 0.19 | 1.59 | 0.004 | 0.0012 | 0.021 | — | 0.06 | 0.021 | 0.007 | 0.0001 | 0.0036 | 0.0042 |
| 22 | 0.085 | 0.15 | 1.45 | 0.004 | 0.0016 | 0.033 | 0.09 | — | 0.008 | 0.006 | 0.0001 | 0.0048 | 0.0023 |
| 23 | 0.069 | 0.12 | 1.43 | 0.002 | 0.0011 | 0.041 | 0.29 | — | 0.014 | 0.018 | 0.0001 | 0.0026 | 0.0027 |
| 24 | 0.088 | 0.06 | 1.78 | 0.012 | 0.0020 | 0.020 | 0.11 | 0.08 | 0.023 | 0.008 | 0.0002 | 0.0037 | 0.0011 |

TABLE 1-continued

| Steel No. | Cu | Cr | V | O | Ceq | TiN | Formula (2) ACR | Formula (3) | Plate Thickness (mm) | Steel Plate Strength (MPa) YS | Steel Plate Strength (MPa) TS | Steel Plate 1/21 Thoughness vE-40° C. | Notes |
|---|---|---|---|---|---|---|---|---|---|---|---|---|---|
| 1 | — | — | 0.016 | 0.0018 | 0.361 | 2.65 | 0.70 | 2.82 | 30 | 421 | 531 | 337 | Conforming Steel |
| 2 | — | 0.34 | — | 0.0022 | 0.409 | 3.14 | 0.68 | 2.75 | 50 | 434 | 541 | 299 | Conforming Steel |
| 3 | 0.15 | 0.44 | 0.019 | 0.0016 | 0.404 | 3.16 | 0.64 | 2.15 | 75 | 397 | 517 | 271 | Conforming Steel |
| 4 | — | — | — | 0.0019 | 0.375 | 3.46 | 0.50 | 2.90 | 100 | 374 | 491 | 255 | Conforming Steel |
| 5 | 0.05 | — | 0.019 | 0.0022 | 0.376 | 3.24 | 0.52 | 2.68 | 100 | 368 | 488 | 263 | Conforming Steel |
| 6 | 0.16 | — | — | 0.0026 | 0.414 | 3.45 | 0.84 | 2.60 | 30 | 413 | 548 | 354 | Comparative Steel |
| 7 | — | — | — | 0.0019 | 0.342 | 2.50 | 0.35 | 2.51 | 50 | 387 | 478 | 237 | Comparative Steel |
| 8 | — | 0.32 | — | 0.0010 | 0.341 | 3.94 | 0.85 | 1.91 | 75 | 352 | 454 | 245 | Comparative Steel |
| 9 | 0.14 | 0.48 | — | 0.0018 | 0.573 | 4.40 | 0.15 | 3.20 | 75 | 412 | 574 | 147 | Comparative Steel |
| 12 | 0.37 | 0.23 | — | 0.0010 | 0.449 | 3.33 | 0.28 | 2.86 | 100 | 325 | 443 | 165 | Comparative Steel |
| 13 | 1.24 | — | — | 0.0016 | 0.400 | 3.79 | 0.59 | 2.69 | 75 | 315 | 457 | 147 | Comparative Steel |
| 14 | — | — | — | 0.0017 | 0.315 | 2.22 | 1.20 | 3.32 | 75 | 309 | 434 | 187 | Comparative Steel |
| 15 | 0.25 | — | — | 0.0015 | 0.360 | 11.14 | 0.67 | 2.74 | 75 | 368 | 489 | 246 | Comparative Steel |
| 16 | — | 0.24 | 0.013 | 0.0017 | 0.404 | 1.60 | 0.52 | 2.81 | 100 | 439 | 526 | 174 | Comparative Steel |
| 17 | 0.14 | 1.48 | — | 0.0024 | 0.637 | 2.96 | 0.90 | 2.36 | 100 | 487 | 567 | 113 | Comparative Steel |
| 18 | — | 0.38 | — | 0.0021 | 0.559 | 3.45 | 0.34 | 3.19 | 100 | 474 | 579 | 98 | Comparative Steel |
| 19 | — | — | 0.081 | 0.0024 | 0.370 | 3.61 | 0.24 | 2.86 | 75 | 397 | 497 | 125 | Comparative Steel |
| 20 | — | — | 0.015 | 0.0030 | 0.348 | 3.23 | -0.20 | 2.62 | 75 | 384 | 489 | 255 | Comparative Steel |
| 21 | 0.23 | — | — | 0.0017 | 0.376 | 1.94 | 1.98 | 2.87 | 100 | 394 | 507 | 249 | Comparative Steel |
| 22 | — | — | — | 0.0023 | 0.333 | 1.25 | 0.60 | 2.29 | 100 | 369 | 487 | 159 | Comparative Steel |
| 23 | — | 0.46 | — | 0.0026 | 0.419 | 6.92 | 0.96 | 2.44 | 100 | 417 | 546 | 137 | Comparative Steel |
| 24 | 0.11 | — | — | 0.0018 | 0.415 | 2.16 | 0.21 | 3.25 | 100 | 429 | 551 | 97 | Comparative Steel |

Formula (1) Ceq = [C] + [Mn]/6 + ([Cu] + [Ni])/15 + ([Cr] + [Mo] + [V])/5

Formula (2) ([Ca] − (0.18 + 130 × [Ca]) × [O])/125/[S]

Formula (3) $5.5[C]^{13} + 15[P] + 0.90[Mn] + 0.12[Ni] + 7.9[Nb]^{12} + 0.53[Mo]$

TABLE 2

| Weld No. | Steel No. | Plate Thickness (mm) | Welding Method | C | Si | Mn | Al | Ni | Mo | Nb |
|---|---|---|---|---|---|---|---|---|---|---|
| A | 1 | 30 | both-side single layer | 0.067 | 0.41 | 1.56 | 0.008 | 0.25 | 0.20 | — |
| B | 1 | 30 | both-side single layer | 0.055 | 0.35 | 1.45 | 0.012 | 0.40 | 0.31 | — |
| C | 1 | 30 | both-side single layer | 0.140 | 0.33 | 1.78 | 0.011 | 0.42 | 0.21 | — |
| D | 2 | 50 | 100 kJ/cm multilayer | 0.062 | 0.30 | 1.29 | 0.005 | 0.30 | 0.20 | — |
| E | 2 | 50 | 100 kJ/cm multilayer | 0.089 | 0.19 | 1.49 | 0.007 | 0.33 | 0.31 | — |
| F | 2 | 50 | 100 kJ/cm multilayer | 0.052 | 1.20 | 1.46 | 0.014 | 0.31 | 0.18 | — |
| G | 2 | 50 | 100 kJ/cm multilayer | 0.058 | 0.33 | 2.68 | 0.005 | 0.33 | 0.27 | — |
| H | 3 | 75 | 100 kJ/cm multilayer | 0.063 | 0.15 | 1.94 | 0.009 | 0.36 | 0.29 | — |
| I | 3 | 75 | 100 kJ/cm multilayer | 0.076 | 0.24 | 1.46 | 0.006 | 0.29 | 0.14 | — |
| J | 4 | 100 | 100 kJ/cm multilayer | 0.076 | 0.38 | 1.95 | 0.007 | 0.38 | 0.25 | 0.003 |
| K | 4 | 100 | 100 kJ/cm multilayer | 0.071 | 0.38 | 1.26 | 0.007 | 0.29 | 0.21 | 0.007 |
| M | 5 | 100 | 100 kJ/cm multilayer | 0.056 | 0.13 | 2.22 | 0.012 | 0.25 | 0.16 | — |
| N | 6 | 30 | both-side single layer | 0.074 | 0.31 | 1.52 | 0.009 | 0.35 | 0.18 | 0.004 |
| P | 7 | 50 | 100 kJ/cm multilayer | 0.067 | 0.48 | 1.49 | 0.011 | 0.34 | 0.16 | — |
| Q | 15 | 75 | 100 kJ/cm multilayer | 0.062 | 0.28 | 1.54 | 0.009 | 0.27 | 0.15 | — |
| R | 20 | 75 | 100 kJ/cm multilayer | 0.068 | 0.24 | 1.59 | 0.010 | 0.27 | 0.13 | 0.003 |
| S | 21 | 100 | 100 kJ/cm multilayer | 0.064 | 0.29 | 1.48 | 0.011 | 0.45 | 0.19 | — |

| Weld No. | Ti | B | Cu | Cr | V | Weld vE-40 (J) WM Center | Weld vE-40 (J) Bond | CTDD (−10° C., mm) WM Center | CTDD (−10° C., mm) Bond | Notes |
|---|---|---|---|---|---|---|---|---|---|---|
| A | 0.012 | 0.0005 | 0.02 | 0.03 | — | 150 | 163 | 0.79 | 0.90 | Example |
| B | 0.013 | 0.0010 | — | 0.05 | — | 187 | 195 | 0.60 | 0.85 | Example |
| C | 0.011 | 0.0008 | — | — | — | 34 | 68 | 0.14 | 0.41 | Comparative Example |
| D | 0.013 | 0.0007 | — | — | — | 187 | 163 | 0.61 | 0.99 | Example |
| E | 0.008 | 0.0011 | — | 0.02 | — | 180 | 164 | 0.96 | 1.24 | Example |
| F | 0.013 | 0.0009 | 0.02 | 0.06 | 0.008 | 54 | 78 | 0.26 | 0.34 | Comparative Example |
| G | 0.011 | 0.0014 | 0.06 | — | — | 47 | 58 | 0.22 | 0.31 | Comparative Example |
| H | 0.008 | 0.0006 | 0.11 | — | — | 156 | 152 | 0.97 | 0.78 | Example |
| I | 0.008 | 0.0005 | — | 0.06 | 0.010 | 162 | 151 | 0.78 | 0.72 | Example |
| J | 0.014 | 0.0013 | — | — | 0.013 | 182 | 163 | 0.94 | 1.29 | Example |
| K | 0.084 | 0.0058 | 0.05 | 0.02 | — | 16 | 29 | 0.09 | 0.17 | Comparative Example |

TABLE 2-continued

| | | | | | | | | | | |
|---|---|---|---|---|---|---|---|---|---|---|
| M | 0.014 | 0.0007 | 0.10 | — | 0.007 | 171 | 169 | 0.97 | 1.63 | Example |
| N | 0.013 | 0.0009 | — | 0.04 | — | 158 | 31 | 0.87 | 0.09 | Comparative Example |
| P | 0.011 | 0.0008 | 0.05 | — | 0.004 | 157 | 27 | 0.82 | 0.12 | Comparative Example |
| Q | 0.028 | 0.0007 | — | 0.04 | — | 153 | 36 | 0.58 | 0.26 | Comparative Example |
| R | 0.016 | 0.0010 | — | — | — | 168 | 97 | 0.67 | 0.35 | Comparative Example |
| S | 0.010 | 0.0012 | 0.09 | — | — | 171 | 94 | 0.76 | 0.40 | Comparative Example |

The invention claimed is:

1. A weld joint produced with a weld metal, using a steel plate as a base metal, wherein
the steel plate comprises a chemical composition including, by mass %,
C: 0.03% to 0.09%,
Si: 0.01% to 0.35%,
Mn: 1.3% to 2.0%,
P: 0.012% or less,
S: 0.0035% or less,
Al: 0.01% to 0.06%,
Ni: less than 0.3%,
Mo: less than 0.10%,
Nb: 0.005% to 0.023%,
Ti: 0.005% to 0.025%,
B: less than 0.0003%,
N: 0.002% to 0.005%,
Ca: 0.0005% to 0.0050%, and
O: 0.0030% or less,
Ceq specified by formula (1) below being from 0.320 to 0.420, Ti/N being from 1.5 to 4.0, formulas (2) and (3) below being satisfied, and a balance being Fe and incidental impurities,
yield stress of the steel plate being 355 MPa or greater, tensile strength of the steel plate being 470 MPa or greater, absorbed energy of the steel plate vE-40° C. at −40° C. in accordance with JIS Z 2241 being 200 J or greater, and
the weld metal comprises a chemical composition including, by mass %,
C: 0.040% to 0.090%,
Si: 0.1% to 0.8%,
Mn: 1.0% to 2.5%,
Al: 0.020% or less,
Ni: 0.1% to 1.0%,
Mo: 0.05% to 0.50%,
Ti: 0.005% to 0.050%, and
B: 0.0015% or less,
a balance being Fe and incidental impurities:

$$Ceq=[C]+[Mn]/6+([Cu]+[Ni])/15+([Cr]+[Mo]+[V])/5 \quad (1)$$

$$0<\{[Ca]-(0.18+130\times[Ca])\times[O]\}/1.25/[S]<1 \quad (2)$$

$$5.5[C]^{4/3}+15[P]+0.90[Mn]+0.12[Ni]+7.9[Nb]^{1/2}+0.53[Mo]\leq 3.00 \quad (3)$$

where brackets [ ] indicate the content by mass % of the element in the brackets.

2. The weld joint of claim 1, wherein the steel plate further includes, by mass %, at least one selected from the group consisting of:
Cu: 0.7% or less,
Cr: 0.1% to 1.0%, and
V: 0.005% to 0.050%.

3. The weld joint of claim 1, wherein a hardness of a central segregation area of the steel plate satisfies formula (4) below:

$$Hvmax/Hvave \leq 1.35+0.006/[C]-t/500 \quad (4)$$

where Hvmax is a maximum Vickers hardness of the central segregation area,
Hvave is an average Vickers hardness of a portion excluding the central segregation area and sections from both front and back surfaces inward to ¼ of a plate thickness,
[C] is the C content by mass %, and
t is a plate thickness of the steel plate in millimeters.

4. The weld joint of claim 1, wherein the weld metal further includes, by mass %, at least one selected from the group consisting of:
Cu: 0.01% to 0.20%,
Cr: 0.01% to 0.50%,
V: 0.001% to 0.080%, and
Nb: 0.001% to 0.040%.

5. The weld joint of claim 2, wherein a hardness of a central segregation area of the steel plate satisfies formula (4) below:

$$Hvmax/Hvave \leq 1.35+0.006/[C]-t/500 \quad (4)$$

where Hvmax is a maximum Vickers hardness of the central segregation area,
Hvave is an average Vickers hardness of a portion excluding the central segregation area and sections from both front and back surfaces inward to ¼ of a plate thickness,
[C] is the C content by mass %, and
t is a plate thickness of the steel plate in millimeters.

6. The weld joint of claim 2, wherein the weld metal further includes, by mass %, at least one selected from the group consisting of:
Cu: 0.01% to 0.20%,
Cr: 0.01% to 0.50%,
V: 0.001% to 0.080%, and
Nb: 0.001% to 0.040%.

7. The weld joint of claim 3, wherein the weld metal further includes, by mass %, at least one selected from the group consisting of:
Cu: 0.01% to 0.20%,
Cr: 0.01% to 0.50%,
V: 0.001% to 0.080%, and
Nb: 0.001% to 0.040%.

8. The weld joint of claim 5, wherein the weld metal further includes, by mass %, at least one selected from the group consisting of:

Cu: 0.01% to 0.20%,
Cr: 0.01% to 0.50%,
V: 0.001% to 0.080%, and
Nb: 0.001% to 0.040%.

* * * * *